United States Patent
Aigner et al.

(10) Patent No.: US 10,378,832 B2
(45) Date of Patent: Aug. 13, 2019

(54) METHOD FOR PRODUCING A PLATE HEAT EXCHANGER USING TWO WELDS, AND A CORRESPONDING PLATE HEAT EXCHANGER

(71) Applicant: LINDE AKTIENGESELLSCHAFT, Munich (DE)

(72) Inventors: Herbert Aigner, Engelsberg (DE); Georg Wimmer, Tüßling (DE); Richard Wimmer, Kraiburg am Inn (DE)

(73) Assignee: LINDE AKTIENGESELLSCHAFT, Munich (DE)

( * ) Notice: Subject to any disclaimer, the term of this patent is extended or adjusted under 35 U.S.C. 154(b) by 101 days.

(21) Appl. No.: 15/516,901

(22) PCT Filed: Oct. 20, 2015

(86) PCT No.: PCT/EP2015/002073
§ 371 (c)(1),
(2) Date: Apr. 5, 2017

(87) PCT Pub. No.: WO2016/062396
PCT Pub. Date: Apr. 28, 2016

(65) Prior Publication Data
US 2017/0307306 A1    Oct. 26, 2017

(30) Foreign Application Priority Data
Oct. 23, 2014   (EP) ..................................... 14003612

(51) Int. Cl.
*F28F 3/08* (2006.01)
*B23K 9/16* (2006.01)
(Continued)

(52) U.S. Cl.
CPC ................ *F28F 3/08* (2013.01); *B21D 53/04* (2013.01); *B23K 9/16* (2013.01); *B23K 9/23* (2013.01);
(Continued)

(58) Field of Classification Search
CPC .... F28F 3/08; F28F 2275/062; F28F 2275/04; B21D 53/04; F28D 9/0093; B23K 9/16;
(Continued)

(56) References Cited

U.S. PATENT DOCUMENTS

| | | | |
|---|---|---|---|
| 5,460,317 A * | 10/1995 | Thomas | B29C 66/1142 228/112.1 |
| 2005/0029242 A1* | 2/2005 | Bonnet | B23K 9/0026 219/137 WM |

(Continued)

FOREIGN PATENT DOCUMENTS

| | | |
|---|---|---|
| DE | 10022595 A1 | 11/2001 |
| EP | 1793193 A2 | 6/2007 |

*Primary Examiner* — Jun S Yoo
(74) *Attorney, Agent, or Firm* — Millen White Zelano & Branigan, PC

(57) ABSTRACT

A method for producing a plate heat exchanger and the plate heat exchanger, particularly a soldered aluminium plate heat exchanger. In the method, a heat exchanger block is provided having a plurality of partition plates and edge strips arranged between the partition plates. A connection device is provided to be mounted on the heat exchanger block. A planar region for securing the connection device to the heat exchanger block is provided with at least one welded weld bead by means of a first weld. The connection device is welded onto the weld bead by means of a second weld. The welding method used for the first weld is a friction stir welding method.

10 Claims, 2 Drawing Sheets

(51) Int. Cl.
| | |
|---|---|
| *B23K 9/23* | (2006.01) |
| *B23K 9/235* | (2006.01) |
| *B23K 20/12* | (2006.01) |
| *B21D 53/04* | (2006.01) |
| *F28D 9/00* | (2006.01) |
| *B23K 101/14* | (2006.01) |
| *B23K 103/10* | (2006.01) |

(52) U.S. Cl.
CPC .......... *B23K 9/235* (2013.01); *B23K 20/1275* (2013.01); *F28D 9/0093* (2013.01); *B23K 2101/14* (2018.08); *B23K 2103/10* (2018.08); *F28F 2275/04* (2013.01); *F28F 2275/062* (2013.01)

(58) Field of Classification Search
CPC ...... B23K 9/23; B23K 20/1275; B23K 9/235; B23K 2103/10; B23K 2101/14
See application file for complete search history.

(56) References Cited

U.S. PATENT DOCUMENTS

| | | | |
|---|---|---|---|
| 2006/0013645 A1 | 1/2006 | Ilyushenko et al. | |
| 2006/0289603 A1* | 12/2006 | Zettler | B23K 20/123 228/2.1 |
| 2010/0181053 A1* | 7/2010 | Hecht | F28D 9/0068 165/164 |
| 2011/0194973 A1* | 8/2011 | Anderson | B23K 35/0227 420/534 |

\* cited by examiner

US 10,378,832 B2

METHOD FOR PRODUCING A PLATE HEAT EXCHANGER USING TWO WELDS, AND A CORRESPONDING PLATE HEAT EXCHANGER

The invention relates to a method for producing a plate heat exchanger and to the plate heat exchanger itself. In particular, the invention is directed to a brazed aluminum plate heat exchanger.

Brazed plated heat exchangers of aluminum have become well-established in numerous installations for transferring heat under a wide variety of pressures and temperatures. For example, they are used for the separation of air, the liquefaction of natural gas or in installations for producing ethylene.

Such a plate heat exchanger is described for example in "The standards of the brazed aluminium plate-fin heat exchanger manufacturers' association" ALPEMA report (2000). A figure taken from it is shown as prior art in FIG. 1 and is described below.

Figure 1:
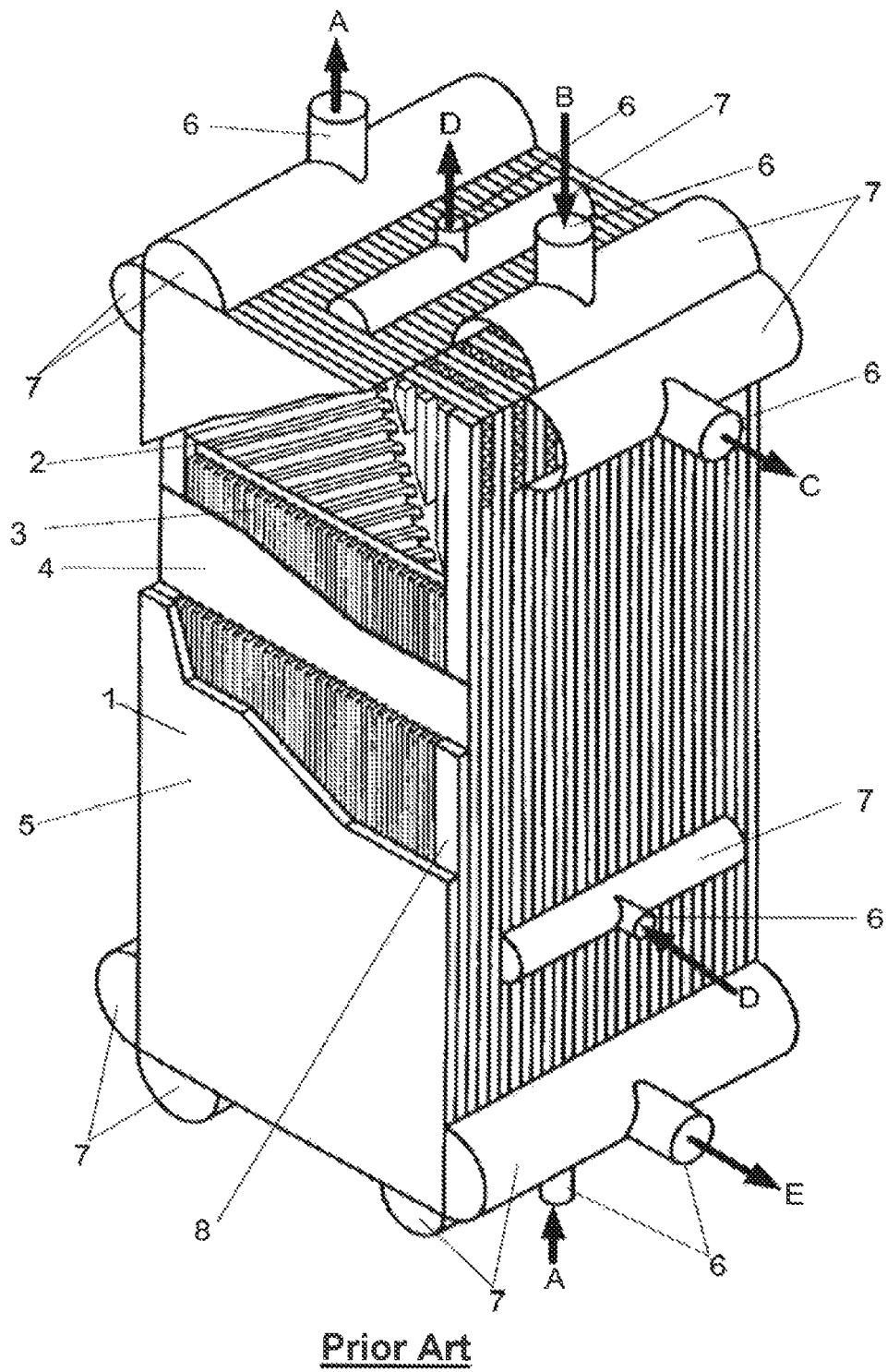

With the plate heat exchanger 1 shown in FIG. 1, a heat exchange can be realized between a number of different process streams, such as for example the depicted process streams A, B, C, D and E. It is of a cuboidal design and is provided with a number of means 6 for supplying and discharging the individual process media. These means 6 are also referred to as nozzles. The heat exchanger likewise has a number of connection devices 7 for distributing and collecting the individual process streams A, B, C, D and E, which are also referred to as headers.

The plate heat exchanger 1 substantially comprises a multiplicity of passages 3, which are arranged in the form of a stack and are separated from one another by parting sheets 4. The various media can flow in the individual passages 3. The heat exchange takes place indirectly by the thermal contact that is realized by the outer sheets 5 and by the corrugated structure arranged in the passages (also referred to as fins). The individual media A, B, C, D and E are introduced into the connection devices or headers 7 by way of the nozzles 6 and thus distributed among the respectively provided passages 3 arranged in the form of a stack. Arranged in the inlet region of the passages are so-called distributor fins 2, which provide a uniform distribution of the medium within the individual passages 3. The media consequently flow through the passages 3 transversely to the direction of corrugation of the fins 3. The fins 3 are connected to the parting sheets 4, whereby an intensive heat-conducting contact is established. This makes a heat exchange possible between two different media that are flowing in adjacent passages 3. Seen in the direction of flow, at the end of the passage there are similar distributor fins 2, which conduct the media out of the passages into the headers 7, where they are collected and drawn off by way of the nozzles 6. The individual passages 3 are closed off outwardly by edge bars 8, known as side bars. The outer delimitation of the overall heat exchanger block is realized by outer sheets 5.

Such plate heat exchangers are outstandingly suitable for heat exchange between at least two media. However, suitable structural designs, as represented in FIG. 1, also allow more than two media to take part in the heat exchange. This allows the process to be carried out very efficiently and for the temperature differences to be used effectively.

Plate heat exchangers are for example brazed from aluminum. The individual passages with the fins, distributor fins, outer sheets and edge bars are stacked one on top of the other, provided with brazing solder and brazed in a furnace. The corrugated fins are thereby also brazed with the adjacent parting sheets 4. The corrugated and brazed fins transfer the forces produced by the internal pressure and, as a result, are decisively responsible for the strength of the heat exchanger block.

Connection devices 7 and nozzles 6 are then welded onto the block created.

The connection devices 7 or headers are usually connected to the heat exchanger block 1 by welding. The welding on of the so-called headers is in this case performed in a conventional way onto the surface of the heat exchanger block 1, produced after the brazing operation, that is formed by the outer sides of the parting sheets 4 and the edge bars 8 arranged in-between. However, when the connection devices 7 are welded onto the heat exchanger block 1, there is the risk that the space enclosed by the respective connection device 7 will be affected by leaks. One reason for this is that possible depressions on the surface of the heat exchanger block 1 are not covered by the welding-on operation, another reason is that brazing inhomogeneities remain on the surface of the heat exchanger block 1.

In particular in the case of brazed heat exchanger blocks 1, it is also often the case that the brazing solder consists of an aluminum alloy containing silicon and/or magnesium. In the range of a critical silicon or magnesium concentration in the brazing solder that connects the parting sheets 4 and the distributor fins 2, during an overwelding there is the risk of regions that have a silicon or magnesium content of about 1% in the weld metal occurring in the welding region. The presence of such an alloy in regions makes the material greatly susceptible to cracks, and consequently possibly results in leaks of the connection device 7 and/or the heat exchanger block 1.

The invention is based on the object of providing a method for producing a plate heat exchanger and also of providing a plate heat exchanger itself, the method allowing the plate heat exchanger to be produced in an easy, low cost and time-saving way, and the plate heat exchanger having a low susceptibility to cracks and a long service life.

This object is achieved by the method according to the invention for producing a plate heat exchanger and by the plate heat exchanger according to the invention as described herein.

The plate heat exchanger is preferably produced by means of the method according to the invention for producing a plate heat exchanger as described herein.

Advantageous refinements of the method according to the invention for producing a plate heat exchanger are also described.

Advantageous refinements of the plate heat exchanger according to the invention are also described.

In the case of the method according to the invention for producing a plate heat exchanger, a heat exchanger block which comprises a number of parting sheets and edge bars arranged in between, known as side bars, is provided. A connection device to be attached to the heat exchanger block, known as a header, is also provided. A planar region intended for fixing the connection device to the heat exchanger block is provided with at least one welding bead, also referred to as a buffer bead, by means of a first welding. The connection device is then welded onto the welding bead produced by the first welding by means of a second welding. In this case, the welding method by which the first welding is performed is a friction stir welding method.

During the friction stir welding, a rotating pin is guided along a predetermined path in the workpiece, and consequently in the material of the parting sheets and of the edge bars, while a stirring motion is performed. By contrast with conventional arc welding, the friction stir welded material does not become molten, but doughy. This has the effect of reducing metallurgically caused crack susceptibility. Moreover, considerably less heat is introduced into the material than in the case of conventional arc welding, so that cracks induced by thermal stress are also prevented.

This friction stir welding may be performed with or without adding a welding filler. If no filler is used, the friction stir welding produces the welding bead just by remelting the surface of the planar region, without increasing the volume of the welded region.

For the purpose of an optimal connection of the connection device, which is usually provided with a rectangular cross section, to the welding bead, the latter should be made to correspond to the contour and dimensions of the connection device in the form of a frame.

The width of the welding bead produced by means of the first welding is preferably dimensioned at least in such a way that a connection device can be welded on the welding bead by the second welding by means of a fillet weld, with the fillet weld only regions of the surface of the plate heat exchanger that have been provided with the welding bead being melted. The width of the welding bead may be for example 2 to 3 times the wall thickness of the connection device in the region to be welded on.

The method according to the invention for producing a plate heat exchanger is preferably to be used for the production of aluminum plate heat exchangers. The connection device also referred to as a header is to be attached in the region of flow openings or passages of the heat exchanger block to the latter, and consequently covers edges of parting sheets arranged in parallel and edge bars arranged in between, known as side bars, or gaps in between. The planar region intended for fixing the connection device to the heat exchanger block may in this case be somewhat larger than the actual surface area that is covered by the connection device on the heat exchanger block in the fastened state, or the edge of the welding bead may be at a certain distance from the edge concerned of the connection device in the welded-on state.

The welding bead or so-called buffer bead is in this case an applied or introduced welding seam for making the material or structure of the connections between the parting sheets and the edge bars more uniform and/or homogeneous. They are made more uniform for example by remelting superficial brazing inhomogeneities, down to a depth of 5 mm, while at the same time eliminating these brazing inhomogeneities. The risk of leaks occurring during the operation of the heat exchanger is thereby reduced considerably. The welding bead to be produced according to the invention may in this case be welded with or without a welding filler being introduced.

In particular in the case of a critical silicon or magnesium content of the brazing solder connecting the parting sheets and the distributor fins, the friction stir welding according to the invention may be used, since the friction stir welding only softens the materials to be welded to a doughy state and does not liquefy them, so that the risk of crack formation is lessened significantly.

In an advantageous refinement of the method, unevennesses of the planar region intended for fixing the connection device to the heat exchanger block are at least partially evened out by means of the first welding to the heat exchanger block. It is thereby possible to even out unevennesses less than a depth or height of 5 mm or with an amplitude of up to 2 mm. Making the surface more uniform in this way has the effect of reducing the effort involved in the subsequent welding seam preparation for welding on the connection device and also of obtaining a lower risk of welding-induced leaks between the heat exchanger block and the connection device.

In a specific refinement of the method for producing the plate heat exchanger, if appropriate the first welding may be performed in such a way that with it brazing inhomogeneities between parting sheets and edge bars are at least partially eliminated. Such brazing inhomogeneities are preferably eliminated completely. As a result, defects occurring in the brazing process can be made good afterwards.

Also provided to achieve the object is a plate heat exchanger according to the invention, which may in particular be an aluminum plate heat exchanger. This plate heat exchanger comprises a heat exchanger block having a number of parting sheets and edge bars arranged in between and a connection device. Between the heat exchanger block and the connection device there is at least one welding bead, welded onto the heat exchanger block by means of a first welding. The connection device is connected in welding terms with the welding bead by means of a second welding.

That is to say that the planar region intended for fixing the connection device to the heat exchanger block is provided with at least one welding bead by means of a first welding and the connection device is connected to the welding bead by means of a second welding. The connection device is in this case preferably welded onto the welding bead produced by means of the first welding.

Said welding bead is in this case welded by means of friction stir welding.

In an advantageous refinement, the plate heat exchanger according to the invention is a brazed plate heat exchanger. That is to say that this plate heat exchanger has for example corrugated plates and fins between the parting sheets that are connected to the parting sheets by means of brazing.

For the connection of the individual passages to the fins, distributor fins, outer sheets and edge bars, the plate heat exchanger may have brazing locations in the form of surface areas or else discrete points. The respective brazing solder that is used may be a silicon alloy, a magnesium alloy or else an alloy comprising magnesium and silicon. For the production of an aluminum plate heat exchanger, these alloys may also respectively have an aluminum alloy component.

The silicon or magnesium content of the welding bead produced by means of the first welding is preferably greater than 1.5% or less than 0.5%. That is to say that a silicon or magnesium content of the welding bead produced that lies outside the range from 0.5% to 1.5% silicon or magnesium should be aimed for.

The welding bead produced on the heat exchanger block may in this case have a welding filler, with which if appropriate a desired silicon or magnesium concentration in the welding bead is also set.

The welding of the welding bead by means of friction stir welding and the associated introduction of less heat makes it possible to prevent a normally increased risk of crack formation in the case of arc welding. That is to say that conventional brazing connections and brazing materials can continue to be used and the connection devices can be welded onto the heat exchanger block without having to accept the risk of crack formation caused by the concentration of silicon or the concentration of magnesium.

Figure 2:
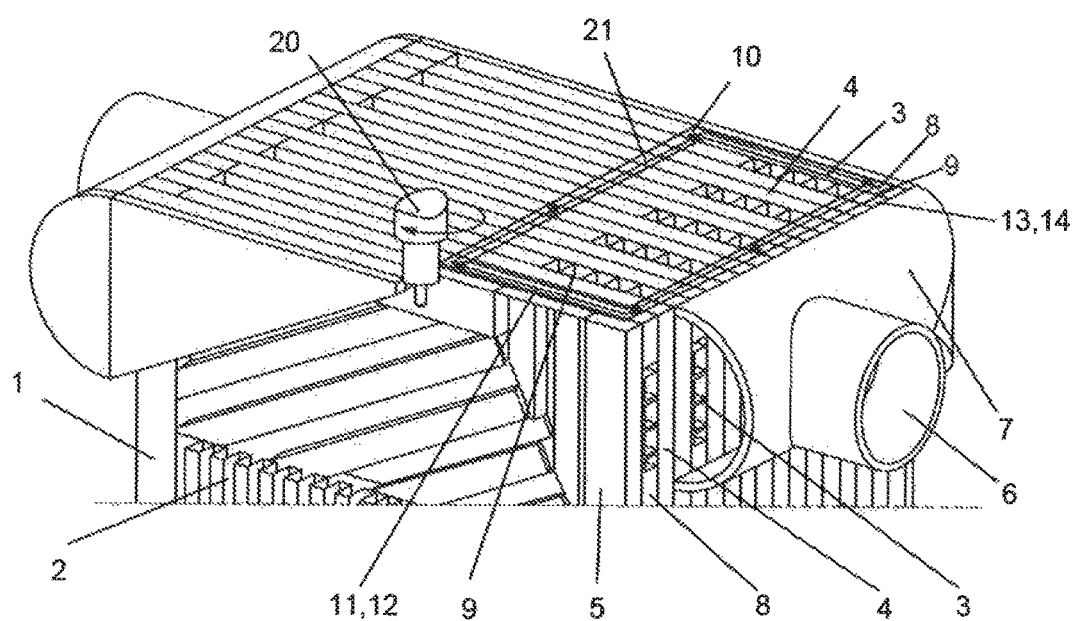

The invention is explained below on the basis of the exemplary embodiments represented in the accompanying drawings, in which FIG. 1 shows a conventional plate heat exchanger, FIG. 2 shows an enlarged, perspective view of an upper region of a heat exchanger block.

The structural design of a conventional plate heat exchanger has already been discussed when presenting the prior art with reference to FIG. 1.

The distributor fins 2, the passages 3 for conducting the process streams A, B, C, D, E, the parting sheets 4 and an outer sheet 5 can also be seen in the heat exchanger block 1 that is represented in FIG. 2. Arranged on the connection devices 7, which are also referred to as headers, are means for supplying and discharging 6 the process streams A, B, C, D, E as nozzles 6. The edge bars 8 that are arranged between individual parting sheets 4 and are also referred to as side bars can also be seen.

In particular because of unavoidable production tolerances and/or brazing-induced heat distortion, gaps 9 may occur between parting sheets 4 and edge bars 8. Moreover, brazing solder that is present between the edge bars 8 and the parting sheets 4 may have certain inhomogeneities. It also cannot be ruled out that the outer surfaces of the parting sheets 4 and of the edge bars 8 have unevennesses. These gaps, inhomogeneities and unevennesses may lead to leaks, in particular in the case of automated welding on of the connection devices 7 onto the heat exchanger block 1.

It is therefore provided according to the invention that the surface of the heat exchanger block 1 in a planar region 10 that is intended for fixing the connection device 7 to the heat exchanger block 1 is provided by means of a welding bead 12 produced in a first welding 11. With this welding bead 12, the planar region 10 is made more uniform and brazing inhomogeneities that may be present there are eliminated. This first welding 11 is carried out by means of friction stir welding, the pin-shaped welding tool 20 that is represented, while undergoing constant rotation about its longitudinal axis, being moved on the translational path 21 indicated by the arrows through the heat exchanger block 1, and consequently through the parting sheets 4 arranged parallel to one another and edge bars 8. The frictional heat thereby generated has the effect that the material of the parting sheets 4 and of the edge bars 8 becomes doughy, and a welded connection is produced between these heat exchanger elements. However, in this case the welded materials are preferably not heated in such a way that a possibly existing critical silicon or magnesium concentration of 0.5% to 1.5% in the welding seam region could lead to the risk of crack formation.

Once the welding bead has been applied, a second welding 13 is used to produce a welding seam 14, with which the connection device 7 is welded onto the welding bead 12, and consequently onto the heat exchanger block 1, as indicated in FIG. 2 at the edge of the connection device 7 already arranged on the heat exchanger block 1.

LIST OF REFERENCE NUMERALS

| | |
|---|---|
| 1 | Heat exchanger block |
| 2 | Distributor fin |
| 3 | Passage |
| 4 | Parting sheet |
| 5 | Outer sheet |
| 6 | Means for supplying and discharging |

-continued

| | |
|---|---|
| 7 | Connection device |
| 8 | Edge bar |
| A, B, C, D, E | Process stream |
| 9 | Gap |
| 10 | Planar region |
| 11 | First welding |
| 12 | Welding bead |
| 13 | Second welding |
| 14 | Welding seam |
| 20 | Welding tool |
| 21 | Translational path |

The invention claimed is:

1. A method for producing a plate heat exchanger, said method comprising in which:
   providing a heat exchanger block comprising a number of parting sheets and edge bars arranged in between,
   providing a connection device to be attached to the heat exchanger block,
   providing at least one welding bead by means of a first welding on a planar region intended for fixing the connection device to the heat exchanger block, and
   welding the connection device onto the welding bead by means of a second welding,
   wherein the first welding is formed by friction stir welding and said first welding is performed only to the extent sufficient to remove brazing inhomogeneities down to a depth of 5 mm.

2. The method for producing a plate heat exchanger as claimed in claim 1, wherein unevennesses of the planar region intended for fixing the connection device to the heat exchanger block are at least partially evened out by the first welding.

3. The method for producing a plate heat exchanger as claimed in claim 1, wherein the plate heat exchanger is an aluminum plate heat exchanger.

4. The method for producing a plate heat exchanger as claimed in claim 1, wherein the welding bead produced by the first welding has a silicon content and/or magnesium content of greater than 1.5% or less than 0.5%.

5. The method for producing a plate heat exchanger as claimed in claim 1, wherein the welding bead produced by the first welding has a silicon content of greater than 1.5% or less than 0.5%.

6. The method for producing a plate heat exchanger as claimed in claim 1, wherein the welding bead produced by the first welding has a magnesium content of greater than 1.5% or less than 0.5%.

7. The method for producing a plate heat exchanger as claimed in claim 1, wherein the welding bead has a welding filler.

8. The method for producing a plate heat exchanger as claimed in claim 1, wherein the plate heat exchanger is a brazed plate heat exchanger.

9. The method for producing a plate heat exchanger as claimed in claim 1, wherein the second welding is a fillet weld.

10. The method for producing a plate heat exchanger as claimed in claim 1, wherein the width of the welding bead is 2 to 3 times the wall thickness of the connection device in the region to be welded on.

* * * * *